US010109151B2

(12) United States Patent
San

(10) Patent No.: US 10,109,151 B2
(45) Date of Patent: Oct. 23, 2018

(54) GAMING MACHINE AND METHOD

(71) Applicant: Ainsworth Game Technology Limited, Newington (AU)

(72) Inventor: Kin Wai San, Maroubra (AU)

(73) Assignee: Ainsworth Game Technology Limited, Newington, NSW (AU)

( * ) Notice: Subject to any disclaimer, the term of this patent is extended or adjusted under 35 U.S.C. 154(b) by 0 days.

(21) Appl. No.: 15/435,651

(22) Filed: Feb. 17, 2017

(65) Prior Publication Data

US 2018/0240303 A1 Aug. 23, 2018

(51) Int. Cl.
*G06F 17/00* (2006.01)
*G07F 17/32* (2006.01)
*G07F 17/34* (2006.01)

(52) U.S. Cl.
CPC ...... *G07F 17/3255* (2013.01); *G07F 17/3213* (2013.01); *G07F 17/3227* (2013.01); *G07F 17/3246* (2013.01); *G07F 17/3258* (2013.01); *G07F 17/3288* (2013.01); *G07F 17/34* (2013.01)

(58) Field of Classification Search
None
See application file for complete search history.

(56) References Cited

U.S. PATENT DOCUMENTS 5,788,573 A 8/1998 Baerlocher et al.
7,216,867 B1 5/2007 Luciano et al.
7,819,741 B1 10/2010 Luciano
8,202,160 B2 6/2012 Englman et al.
8,226,461 B2 * 7/2012 Gauselmann ........... G07F 17/32 463/16
8,257,161 B2 9/2012 Louie et al.
8,262,460 B2 9/2012 Mattice et al.
9,123,209 B2 9/2015 Pavey et al.
9,311,787 B2 4/2016 Meyer
9,582,967 B2 2/2017 Meyer
9,875,602 B2 * 1/2018 Prabhu ................ G07F 17/3213
2002/0193158 A1 12/2002 Weiss et al.
2004/0053660 A1 3/2004 Webb et al.
2005/0070353 A1 3/2005 Webb et al.
2006/0142077 A1 6/2006 Miles et al.
2007/0117610 A1 5/2007 Webb et al.
2010/0004049 A1 1/2010 Ching et al.
2012/0015707 A1 1/2012 Hornik et al.
2012/0122545 A1 5/2012 Watniks et al.
2015/0018068 A1 1/2015 Wadleigh et al.
2015/0262449 A1 * 9/2015 Meyer ..................... G07F 17/34 463/20
2017/0124805 A1 * 5/2017 Prabhu ................ G07F 17/3255

* cited by examiner

*Primary Examiner* — Ronald Laneau
(74) *Attorney, Agent, or Firm* — Cook Alex Ltd.

(57) ABSTRACT

The invention provides a gaming machine comprising a display for displaying a game comprising game symbols arranged into an array of game positions. A controller controls the display of randomly selected game symbols on the display in an array of game positions, preferably arranged into reels. One or more bonus positions are also displayed above the reels, the bonus positions each being associated with a reel. The bonus positions each display a bonus symbol associated with a game enhancing element, such as a credit prize, free games or a jackpot. When a trigger is displayed in a game position of a reel, the controller must award the game enhancing element associated with the bonus symbol displayed in the bonus position associated with the reel. A method is also provided.

20 Claims, 10 Drawing Sheets

GAMING MACHINE AND METHOD

BACKGROUND

The present invention relates to a gaming machine. The invention has been developed primarily for use as an electronic gaming machine and will be described hereinafter by reference to this application. However, it will be appreciated that the invention may also be implemented for any type of gaming machine, including a mechanical or electro-mechanical gaming machine.

The following discussion of the prior art is intended to present the invention in an appropriate technical context and allow its advantages to be properly appreciated. Unless clearly indicated to the contrary, however, reference to any prior art in this specification should not be construed as an express or implied admission that such art is widely known or forms part of common general knowledge in the field.

Conventional gaming machines typically involve awarding prizes to a player according to predetermined combinations of game symbols that appear on an array of game squares displayed on a screen, typically organised into three rows and five columns (a 5×3 array). Other arrays, such as a 3×3 or 4×3, may be used. Each gaming machine randomly selects the game symbols that appear on the array, each column of the array being a "reel".

One type of gaming machine comprises a mechanical or electro-mechanical device, where a motor rotates a plurality of annular rings or drums that form reels. Each reel has a reel strip that displays game symbols in preset game symbol positions. A frame covers the rings to provide a window through which only a subset of game symbol positions (and hence game symbols) were visible to the player. Thus, for a game using a 5×3 array, the window would only permit three rows of five rings to be visible to create the game array. An internal controller within the gaming machine controls operation of the motor and hence rotation of the reels. Thus, by controlling when each reel starts and stops in its respective rotation, the controller controls the display of the game symbols in the window. Sensors linked to the reels indicate which game symbols are displayed in the window and communicate with the controller so that the controller is able to award prizes based on winning combinations of game symbols displayed on the reels in the window. The controller typically comprises one or more electric circuits for controlling various functions of the gaming machine, such as the above mentioned control of the motor, communicating with the sensors, verifying that the correct amount of a bet has been made via one or more value receiving mechanisms to enable operation of the motors, controlling any visual and/or audio effects associated with operation of the gaming machine and controlling operation of various alarms to alert any tampering with the gaming machine.

Another type of gaming machine, known as an electronic gaming machine or EGM, replaces the mechanical reels and motor with a video display screen on which video images of the reels are displayed. The EGM has an internal electronic controller, typically a computer, that controls the display of images on the video display screen so that the reels are visibly spun on the screen to simulate a physical reel of a traditional gaming machine. EGMs tend to be more versatile in providing game information, varying the probabilities for a player to win a prize and varying the type of game that is played.

Bonus or "feature" games may also be provided by a gaming machine in addition to a base or main game. Typically feature games use the same set of reels as the main game and are limited to a set of free games operated under a single set of rules. This means that the feature game is restricted by the same set of rules, and so there is no variation in the play of the feature game. Also, gaming machines can offer one or more bonus prizes to the player during play of the game. The most common type of bonus prize that is awarded by the gaming machine is a jackpot prize, the main example of which is a progressive jackpot prize.

This standard structure to game play and bonus prizes limits the operation of the gaming machine, irrespective of whether it is a mechanical, electro-mechanical or electronic gaming machine. Consequently, it is difficult to retain player interest because there is no apparent incentive for the player to continue playing the gaming machine once the player becomes familiar with the feature game, the main game and any bonus prizes.

It is an object of the present invention to overcome or substantially ameliorate one or more of the disadvantages of prior art, or at least to provide a useful alternative.

SUMMARY

The present invention provides a gaming machine that has improved operation and performance relative to existing prior art gaming machines. As such, the gaming machine and associated method according to the invention provides an improved gaming machine in that that the award of enhanced prizes is more efficient and in a more entertaining manner compared to presently existing gaming machines. The present invention also improves the application of a controller operating the gaming machine.

One embodiment of the invention provides a gaming machine comprising:

a display for displaying a game, wherein the game comprises randomly selected game symbols displayed in an array of game positions, and where predetermined winning combinations of the randomly selected game symbols in the game award prizes to a player; and a controller for controlling the display of the game symbols on the display;

wherein the controller causes the display of one or more bonus positions, at least one of the bonus positions being associated with at least one group of game positions, the bonus positions being configured to display bonus symbols associated with game enhancing elements in the game; and wherein, in the response to a trigger symbol being displayed in one of the game positions in the at least one group, the controller must award the game enhancing element associated with the bonus symbol displayed in the bonus position associated with the at least one group.

Another embodiment of the invention provides a gaming machine comprising:

a display for displaying a game, wherein the game comprises randomly selected game symbols displayed in an array of game positions and where predetermined winning combinations of the randomly selected game symbols in the game award prizes to a player; and a controller for controlling the display of the game symbols on the display, wherein the controller is configured to:

provide the array with the game positions arranged into one or more groups;

provide one or more bonus positions, the bonus positions each displaying a bonus symbol associated with a game enhancing element;

associate at least one bonus position with at least one group;

randomly select the game symbols for display in the game positions of the array;

randomly select the bonus symbols for display in the bonus positions;

cause the display to display the randomly selected game symbols and bonus symbols;

determine whether a trigger symbol is displayed in a game position of the at least one group; and in response to the trigger symbol being displayed in the game position of the at least one group, always award the game enhancing element associated with the bonus symbol displayed in the bonus position associated with the at least one group.

A further embodiment of the invention provides a gaming machine comprising:

a display for displaying a game, and;

a controller for controlling the display of the game symbols on the display; and a value transfer mechanism for receiving value from the player, wherein the controller is in communication with the value transfer mechanism;

wherein the controller is configured to:

determine if a wager has been received via the value transfer mechanism;

display a play of the game on the display including one or more configurations of game symbols if the wager has been received, one or more of the configurations of game symbols being associated with a game outcome, the game outcome being associated with a value award payable to a player;

provide an array of game positions in which to display the one or more configurations of game symbols; the game positions being arranged into one or more groups;

provide one or more bonus positions, the bonus positions each displaying a bonus symbol associated with a game enhancing element;

associate at least one bonus position with at least one group;

display randomly selected bonus symbols in the bonus positions;

determine whether a trigger symbol is displayed in a game position of the at least one group; and in response to the trigger symbol being displayed in the game position of the at least one group, always award the game enhancing element associated with the bonus symbol displayed in the bonus position associated with the at least one group.

Yet another embodiment of the invention provides a method comprising:

displaying game symbols for playing a game, wherein the game comprises game symbols and predetermined winning combinations of randomly selected game symbols award prizes to a player;

providing an array of game positions to display game symbols, the game positions being arranged into one or more groups;

providing one or more bonus positions, the bonus positions each displaying a bonus symbol associated with a game enhancing element;

associating at least one bonus position with at least one group;

displaying randomly selected game symbols in the game positions of the array;

displaying randomly selected bonus symbols in the bonus positions;

determining whether a trigger symbol is displayed in a game position of the at least one group; and where the trigger symbol is displayed in the game position of the at least one group, always awarding the game enhancing element associated with the bonus symbol displayed in the bonus position associated with the at least one group.

A further embodiment of the invention provides a method of operating a gaming machine comprising a display and a controller, the method comprising:

the controller communicating with the display to controllably display game symbols for playing a game, wherein the game comprises predetermined winning combinations of randomly selected game symbols award prizes to a player;

the controller communicating with the display to display an array of game positions to display the game symbols, the game positions being arranged into one or more groups;

the controller communicating with the display to display one or more bonus positions, the bonus positions each displaying a bonus symbol associated with a game enhancing element;

the controller associating at least one bonus position with at least one group;

the display displaying in the game positions of the array game symbols randomly selected by the controller;

the display displaying in the bonus positions bonus symbols randomly selected by the controller;

the controller determining whether a trigger symbol is displayed in a game position of the at least one group; and where the trigger symbol is displayed in the game position of the at least one group, the controller always awarding the game enhancing element associated with the bonus symbol displayed in the bonus position associated with the at least one group.

A still further embodiment of the invention provides a method comprising:

determining if a wager has been received via a value transfer mechanism;

displaying a game on the display including one or more configurations of game symbols if the wager has been received, one or more of the configurations of game symbols being associated with a game outcome, the game outcome being associated with a value award payable to a player;

providing an array of game positions in which to display the one or more configurations of game symbols; the game positions being arranged into one or more groups;

providing one or more bonus positions, the bonus positions each displaying a bonus symbol associated with a game enhancing element;

associating at least one bonus position with at least one group;

displaying randomly selected bonus symbols in the bonus positions;

determining whether a trigger symbol is displayed in a game position of the at least one group; and in response to the trigger symbol being displayed in the game position of the at least one group, always awarding the game enhancing element associated with the bonus symbol displayed in the bonus position associated with the at least one group.

A yet further embodiment of the invention provides a method comprising:

determining if a wager has been received via a value transfer mechanism;

displaying a game on a display including one or more configurations of game symbols if the wager has been received, one or more of the configurations of game symbols being associated with a game outcome, the game outcome being associated with a value award payable to a player;

a controller communicating with the display to controllably display game symbols for playing a game, wherein the game comprises predetermined winning combinations of randomly selected game symbols award prizes to a player;

the controller communicating with the display to display an array of game positions to display the game symbols, the game positions being arranged into one or more groups;

the controller communicating with the display to display one or more bonus positions, the bonus positions each displaying a bonus symbol associated with a game enhancing element;

the controller associating at least one bonus position with at least one group;

the display displaying in the game positions of the array game symbols randomly selected by the controller;

the display displaying in the bonus positions bonus symbols randomly selected by the controller;

the controller determining whether a trigger symbol is displayed in a game position of the at least one group; and where the trigger symbol is displayed in the game position of the at least one group, the controller always awarding the game enhancing element associated with the bonus symbol displayed in the bonus position associated with the at least one group.

A further embodiment of the invention provides a computer system comprising a central processing unit configured for communication with a gaming machine, wherein the computer system is configured to perform the method of any one of the above described embodiments of the invention.

A further embodiment of the invention provides a computer program configured to perform the method of any one of the above described embodiments of the invention.

A further embodiment of the invention provides a non-transitory carrier medium carrying computer executable code that, when executed on a central processing unit configured for communication with a gaming machine, causes the central processing unit to perform the method of any one of the above described embodiments of the invention.

Throughout the specification and unless explicitly stated otherwise, the term "value" means credits, gaming tokens, coins, paper, currency, tickets, vouchers, credit cards, debit cards, smart cards, memory devices capable of storing value and any other object representative of value.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Furthermore, as used herein and unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

BRIEF DESCRIPTION OF THE DRAWINGS

The disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings is necessarily to scale. Thus, preferred embodiments of the present disclosure will now be described, by way of example only, with reference to the accompanying drawings in which.

DETAILED DESCRIPTION OF VARIOUS EMBODIMENTS

Figure 1:
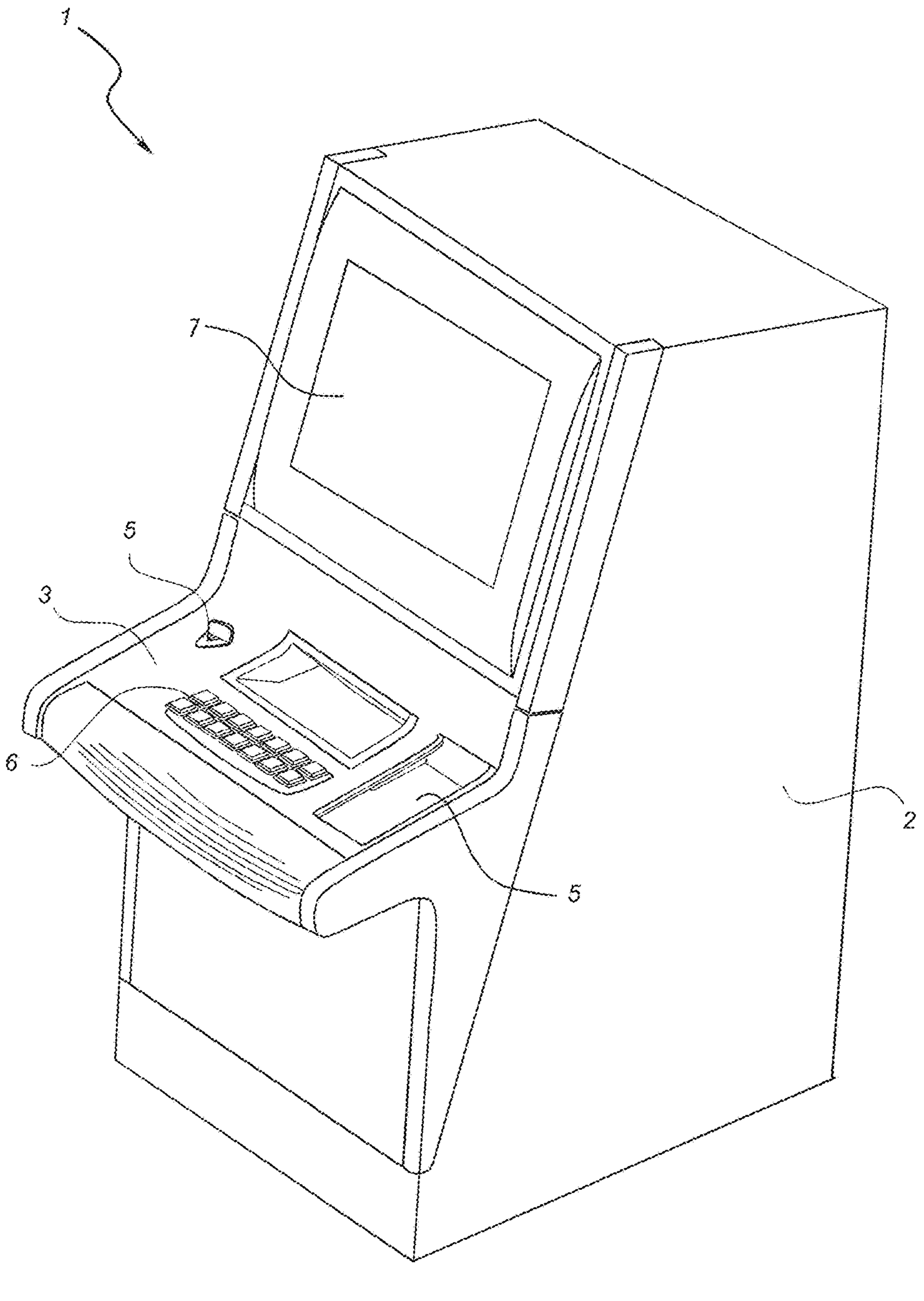
FIG. 1 is a perspective view of a gaming machine according to a first embodiment of the present disclosure.

The present invention will now be described with reference to the following examples which should be considered in all respects as illustrative and non-restrictive. In the Figures, corresponding features within the same embodiment or common to different embodiments have been given the same reference numerals.

In general terms, a gaming machine according to the embodiments described herein includes at least one display, a value transfer mechanism in the form of a value input, and an electronic controller coupled to the at least one display and the value input.

The controller is configured to determine if a wager has been received via the value input, and to display a game on the at least one display if a wager has been received. The first game includes one or more configurations of game symbols, one or more of the configurations of game symbols being associated with a game outcome, the game outcome being associated with a value award payable to a player.

Referring to FIG. 1, a gaming machine 1 according to a first embodiment of the invention includes a cabinet 2, a console 3 and an internal controller 4. The console 3 has various input devices including vending slots 5 for receiving monetary bets and a plurality of buttons 6 for actuation by a player. It will be appreciated that in other embodiments the vending slots 5 may be replaced with other types of value input/value output devices, such as a coin acceptor, a paper currency acceptor, a ticket reader and/or printer or a card reader and/or writer.

The vending slots 5 can be configured to receive value, such as cash in the form of banknotes and coins, or credits representing a monetary amount from a memory device, such as but not limited to a memory card, smart card, a radio frequency identification (RFID) device, USB key, magnetic card or other electronic storage device. Typically, the memory device is a credit card, debit card or other card that enables the transfer of monetary credit to the gaming machine 1. Other forms of value include gaming tokens, paper, tickets, vouchers, and any other object representative of value.

Figure 2:
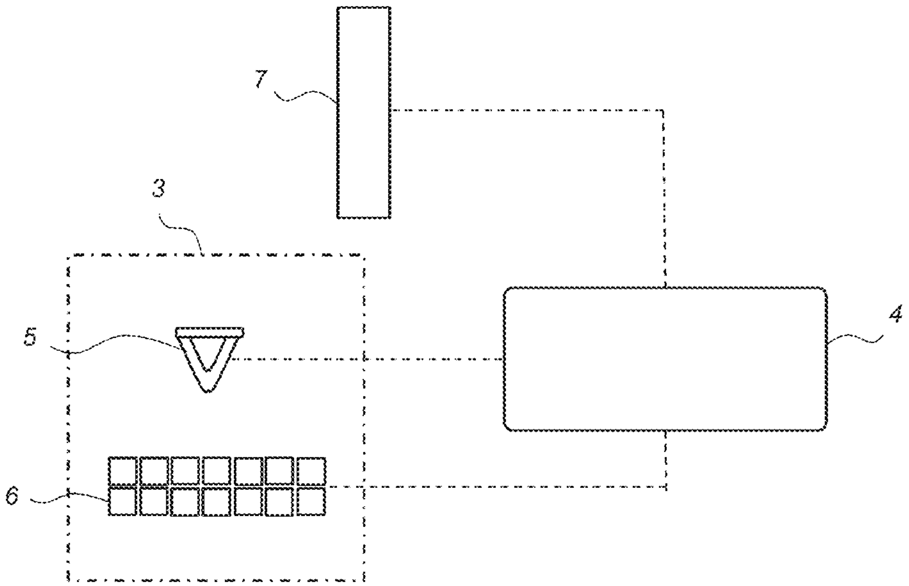
FIG. 2 is a schematic drawing of a controller for the gaming machine of FIG. 1.

The controller 4 is generally in the form of an electronic controller comprising a central processing unit, such as a computer, and is in electronic communication with a display in the form of a video display screen 7, as well as various input devices on the console 3, as best shown in FIG. 2. Typically, the electronic controller 4 also comprises a random access memory (RAM) associated with the central processing unit, the RAM being used to store program instructions and transient data related to the operation of the electronic controller and hence the gaming machine 1. The RAM contains a body of program instructions for implementing a game on the gaming machine 1, as discussed in more detail below. The central processing unit or processor may also be operatively associated with a further storage device, such as a hard disk drive, which is used for long-term storage of program components and data relating to the electronic controller 4 and/or the gaming machine 1, including a database for game performance data, as well as information gathered from users. It is also appreciated that a person skilled in the art would readily understand the location and use of the electronic controller 4 in the gaming machine 1.

The electronic controller 4 will transmit and receive signals to and from each of the input devices and the display 7, usually via wired connections but can include wireless modes of electronic communication, such as WLAN. In the case of the vending slots 5 (or with any other type of value transfer mechanism), there may be an intermediate credit verification device that examines and verifies the cash or credits received by the vending slots. Once the value (such as cash or credits) have been verified by the credit verification device, a signal is sent to the electronic controller 4, which then determines whether the minimum bet level has been reached. If so, the electronic controller 4 will permits play of the game on the gaming machine 1. If not, the electronic controller 4 will send a signal to the display 7 to show a message requesting further value to be added to the gaming machine 1.

Figure 3:
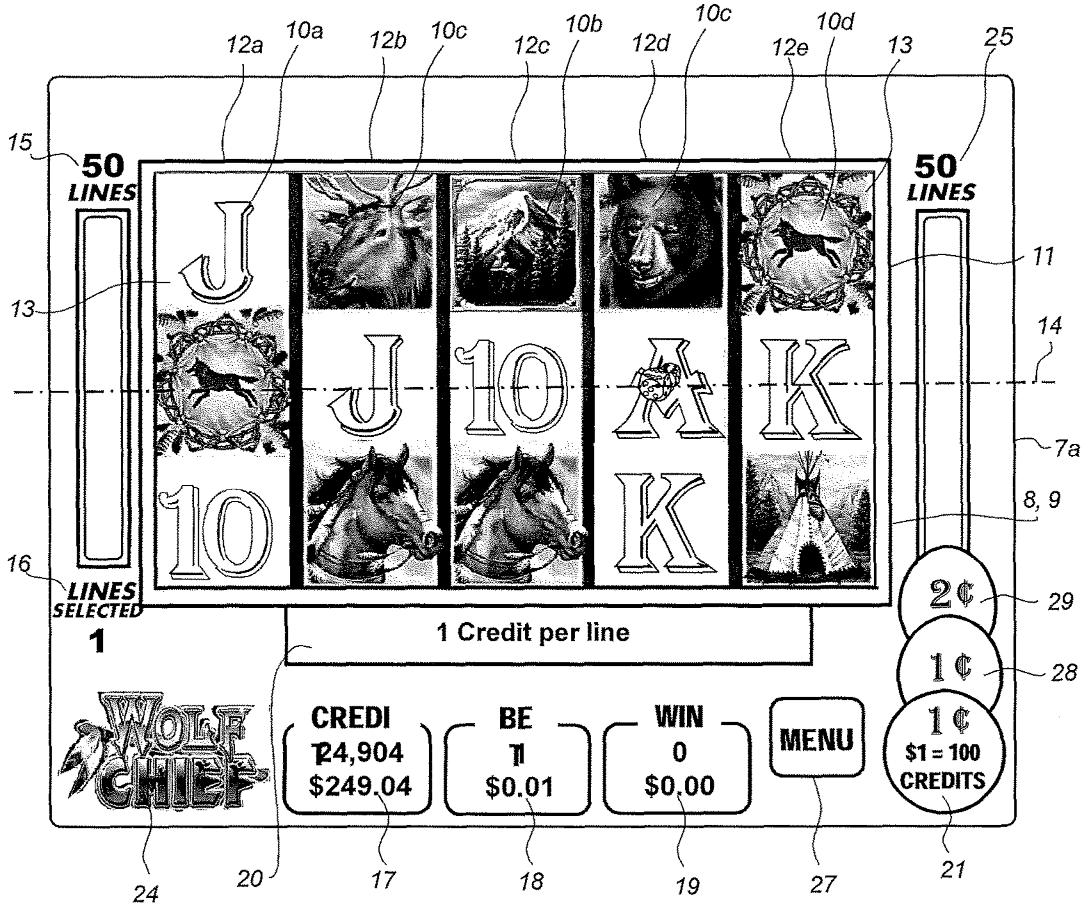
FIG. 3 is a front view of the display of the gaming machine of FIG. 1 illustrating a base game.
Figure 4:
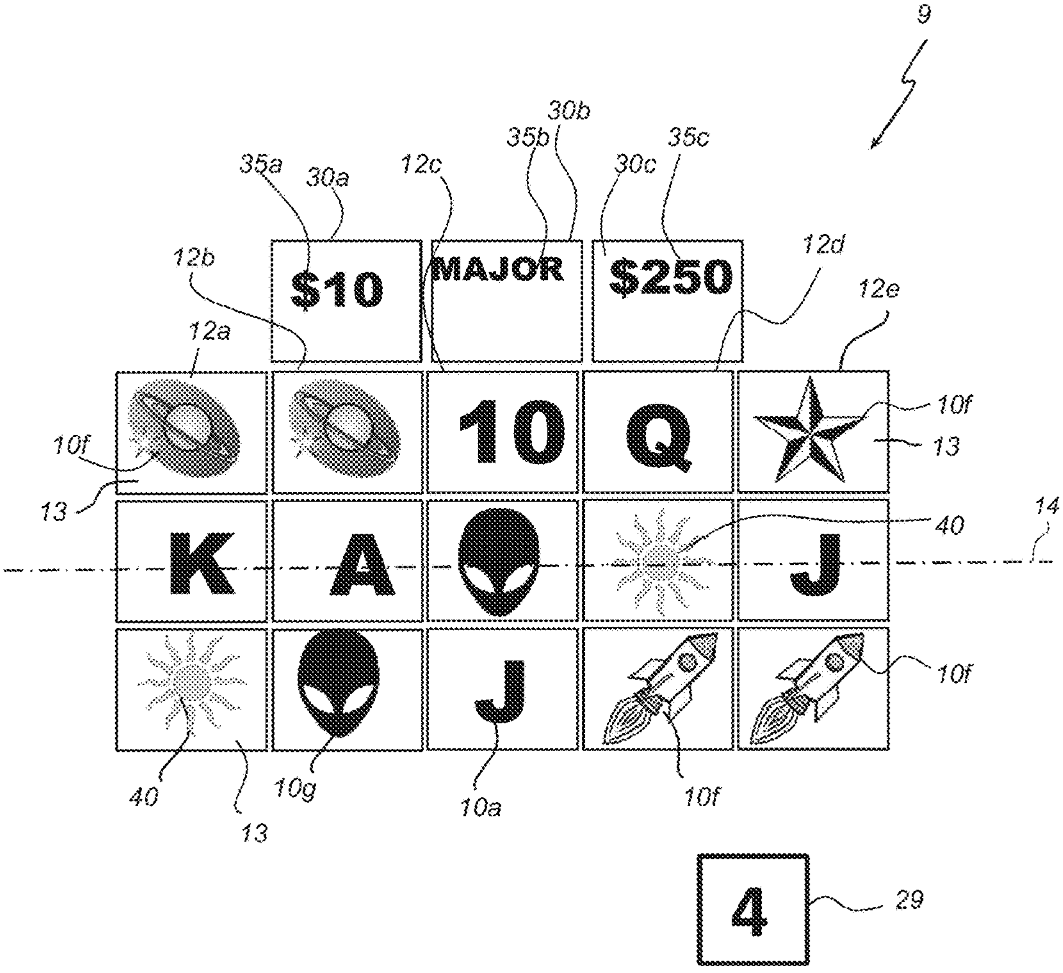
FIGS. 4 to 8 is are partial simulated screen shots illustrating a feature game shown on the display of the gaming machine of FIG. 1.

The electronic controller 4 is programmed to provide a game in the form of a base game 8 (as best shown in FIG. 3) and a feature game 9 (as best shown in FIGS. 4 to 8) on a lower playing area 7*a* of the display 7 of the gaming machine 1 for play by a player. An upper display area (not shown) is reserved for showing artwork associated with the game(s) that are available for play on the gaming machine and/or other game information. The base game 8 has game symbols 10 arranged into an array 11 in the form of five columns or "reels" 12. The reels 12 give the visual appearance of rotating, typically by having the game symbols 10 move in a downward linear path along the length of each reel 12. While the array 11 is arranged with five reels 12 and three rows as per the industry standard, it will be appreciated by one skilled in the art that other types of arrays could be used, such as 3×3, 4×3, 5×5, 4×4, etc, including arrays having an irregular number of rows and/or columns. For example, the array 11 can have an unequal number of rows and/or columns, where some columns have less or more rows than other columns or where some rows have less or more columns than other rows. A more specific example would be an array having three columns with only two rows and two columns with three rows. The electronic controller 4 will transmit signals to the display screen 7 to cause the base game 8 and feature game 9 to be played on the lower playing area 7*a*, including showing the game symbols 10, array 11 and other visible elements of the games.

The array 11 of the base game 8 defines predetermined game or symbol positions 13, in which the game symbols 10 appear. The symbol positions 13 are not visually marked by boundary lines and simply provide an area for the game symbols 10 to appear. However, it will be appreciated that in other embodiments, the symbol positions 13 are defined by visible boundary lines (to define "squares" or game positions) or other markings to define each respective area of the symbol positions.

The array 11 is arranged so that a player can select one or more predetermined "pay lines" 14 defined around the array, which correspond to combinations of the symbol or game positions 13, one example of which is illustrated in FIG. 3. The pay lines 14 correspond to the lines selected by the player and generally comprise at least one game position or symbol position 13 from each reel 12. The number of pay lines 14 that can be selected by the player depends on the amount of the monetary bet for playing a game on the array 11. In the base game 8, predetermined winning combinations of randomly selected game symbols 10 result in the award of prizes to the player.

The game symbols 10 can include a mixture of picture symbols (such as animal symbols or playing card symbols), word symbols, scatter symbols, substitute or wild card symbols and trigger symbols to trigger the feature game 9. Those skilled in the art will readily understand that a substitute symbol is able to act as any other game symbol, and hence is also known as a "wild card" symbol. Likewise, those skilled in the art will readily understand that a scatter symbol is a symbol that triggers a game event or confers an award without having to appear on a player-selected pay line 14. Similarly, a trigger symbol is a symbol that triggers a game event or confers an award, where the trigger symbol may or may not have to appear in combination and may or may not have to appear on the same player-selected pay line 14. In this embodiment, the game symbols 10 include playing card symbols 10*a*, animal-themed symbols 10*b*, item-themed symbols 10*c*, scatter symbols in the form of Wolf Flag symbols 10*d* and a substitute or wild card symbol in the form of Horse symbols 10*e*. The electronic controller 4 randomly determines the appearance of the game symbols 10 on the array 11.

The video screen 7 also displays other standard game information in the lower playing area 7*a*, including the number of pay lines available 15, the number of player-selected pay lines 16, the amount of player credits 17, the amount of the current bet wagered by the player 18, the amount of wins by the player 19, a message area 20, a current denomination button 21 indicating the currently selected base bet denomination and the name 22 of the brand or type of game that the base game 8 belongs to, being Chief™. The video screen 7 displays the name 24 of the base game 8, Wolf Chief™, as best shown in FIG. 3. In other embodiments, the video screen 7 displays a menu button for bringing up a menu screen (typically explaining the game rules and showing the available pay lines 14) and/or jackpot information relating to the based game 8 and feature game 9 that are awarded by the electronic gaming machine 1. This jackpot information is typically displayed in the upper display area and can comprise, in descending order of monetary value, a grand jackpot, major jackpot, minor jackpot and midi jackpot.

In the base game 8, the player initially makes a bet using vending slots 5 to initiate play of the gaming machine 1 by building up credit to play the base game 8 on the gaming machine. For example, the player can bet or wager monetary amounts equivalent to a particular amount of credits, depending on the bet denomination selected for the base game. Also, the player can make any additional side bets or ante-bets during play of the base game 8 once the base game has commenced to access additional features in the base game, such as increasing the number of winning combinations in the base game.

Typically, gaming machines offer a number of preset bet options that the player can make, and these bet options can vary depending on the game or games offered on the gaming machine. For example, a game on a gaming machine may provide bet options of 1 credit, 2 credits, 5 credits and 10 credits per player-selected pay line 14. In another example, the player may bet 1 credit, 2 credits, 5 credits and 10 credits for a preset group or combination of pay lines 14, such as a group of 5 pay lines, 10 pay lines, 20 pay lines, etc.

The gaming machine 1 also has a default bet denomination, which is usually the bet denomination that was previously used in the preceding play of the base game 8. For example, if a person had played the base game 8 with a bet denomination of 5¢, then this would be the default bet denomination for the player when he or she commences play of the game. Where the gaming machine has not yet been played or has been started up, the default bet denomination is initially selected by the electronic controller 4. The default bet denomination can be randomly selected or chosen according to a predetermined order. Usually, the electronic controller 4 will select the bet denomination with the lowest value that is available for the base game 8, which would be the 1¢ bet denomination for this embodiment. The player may change the bet denomination at any time in the base game 8 by touching the denomination button 21 before or after the reels 12 have spun. In this embodiment, touching the denomination button will bring denomination images that the player may select to quickly change the bet denomination between plays of the game 8.

Once the player has commenced play of the game 8 by making an appropriate bet via the vending slots 5, the electronic controller 4 then commences a play of the base game 8 by sending a signal to the display 7 to cause the reels 12 to appear to visibly rotate or "spin" in a linear path, typically in a downward vertical direction, and randomly display the game symbols 10 in each game position for each play of the array 11 for the base game 8. After the reels 12 stop spinning (and thus ends the spin or play of the base game 8), the electronic controller 4 determines whether there are any predetermined winning combinations of the game symbols 10 appearing in any player-selected pay lines 14, such as a two of a kind, three of a kind, four of a kind or five of a kind for all the game symbols 10 and other combinations of a "full house", "straight" or "flush" for the playing card game symbols 10*a*. It will be appreciated that other winning combinations of game symbols 10 can also be provided. If so, the gaming machine 1 enters a winning game state and awards a prize according to the displayed predetermined winning combination.

The electronic controller 4 also determines whether the feature game 9 should be activated, based on a predetermined trigger event, such as the appearance of a number of feature game trigger symbols appearing in a play or spin of the base game 8. In this embodiment, the trigger event is the appearance of three scatter symbols 10*d*; i.e. the feature game trigger symbols are the scatter symbols 10*d*. The scatter symbols 10*d* need not appear on the same pay line 14, but can appear on any of the player-selected pay lines.

In response to the trigger event, the electronic controller 4 then transmits a signal to the video screen 7 to cause the feature game 9 to appear on the video screen 7, as best shown in FIGS. 4 to 8. The feature game 9 also uses the same array 11, reels 12, game positions 13 and player-selectable pay lines 14 as the base game 8 on the video screen 7. However, in this embodiment, the feature game 9 has a space theme, with space-themed picture symbols 10*f* and substitute Alien symbols 10*g* in addition to playing card symbols 10*a* that are substantially the same as the game symbols 10*a* in the base game 8.

In the feature game 9, five free plays or spins of the feature game are awarded to the player without having to make an additional bet or wager. It will be understood by those skilled in the art that a free play or spin involves a play of the game without requiring any bet to be made by the player, and that any number of free spins can be chosen for the feature game 9. In addition, it will be appreciated that in the art free spins are commonly referred to as "free games". The number of free games remaining in the feature game 9 is indicated by a counter 29. Typically, the prizes awarded for the same winning combinations of game symbols in the feature game 9 are of higher value than the prizes awarded in the base game 8.

The feature game 9 also comprises a set of bonus positions 30*a*, 30*b*, 30*c* that are associated with three of the reels 12. In this embodiment, the number of bonus positions 30 are less than the number of reels and are associated with the middle three reels 12*b* to 12*d*. Hence, the bonus position 30*a* is associated with reel 12*b*, the bonus position 30*b* is associated with reel 12*c* and the bonus position 30*c* is associated with reel 12*d*. This association is indicated by locating each bonus position 30*a* to 30*c* adjacent their associated reel 12*b* to 12*d* and in this embodiment, the bonus positions 30 are located above each reel 12*b* to 12*d*.

The bonus positions 30*a* to 30*c* each display bonus symbols 35*a*, 35*b*, 35*c* that are associated with game enhancing elements that modify the outcome of the reel spin. In this embodiment, the bonus symbols 35 correspond to the game enhancing element that is conferred; i.e. the bonus symbols 35 describe the game enhancing element, such as MINOR jackpot, 5 Free Games or $200 credit prize. However, in other embodiments, the bonus symbols may comprise different images that are associated with each game enhancing element or type of game enhancing element. For example, a planet symbol may be used to indicate a credit prize, a comet symbol may be used to indicate the award of additional free games/spins and a galaxy symbol may be used to indicate a jackpot. In another example, different planet symbols may indicate credit prizes of different value, and so on for each game enhancing element.

There is also a special or trigger symbol 40 that is used to trigger the award of the game enhancing element associated with the bonus symbols 35*a* to 35*c* displayed in the bonus positions 30*a* to 30*c*, which will be discussed in more detail below. Generally, the game enhancing element modifies the result of a play of the feature game 9. The game enhancing elements may provide different types of effects or modifications of the game play result.

The feature game 9 operates in a similar manner to the base game 8, where the reels 12 visibly rotate and display randomly selected game symbols 10 in each game position 13, as best shown in FIGS. 4 to 8. Predetermined winning combinations of randomly selected game symbols 10 in the array 11 of the feature game 9 also result in the award of prizes to the player, usually of an enhanced value compared to the prizes awarded in the base game 8, and/or with an increased frequency (i.e. the feature game 9 has higher win probability compared to the base game 8).

When the trigger symbol 40, which in this embodiment is a Sun symbol, is displayed in the one of the game positions 13 of a reel 12*b* to 12*d* associated with one of the bonus positions 30*a* to 30*c*, the electronic controller 4 causes the game enhancing element associated with the bonus symbol 35 displayed in the bonus position 30*a* to 30*c* associated with that reel. For example, in FIG. 4, the first free game or spin of the feature game 9 results in a $10 bonus symbol 35*a* being displayed in the bonus position 30*a*, a MAJOR bonus symbol 35*b* being displayed in the bonus position 30*b* and a $250 bonus symbol 35*c* being displayed in the bonus position 30*c*. A trigger Sun symbol 40 is displayed in the middle game position 13 of the reel 12*d*. This causes the game enhancing element of a $200 credit prize, which corresponds to the bonus symbol 35*c* displayed in the bonus position 30*c* associated with the reel 12*d*, to be awarded to the player. If a Sun symbol 40 had been displayed on reel 12*b*, the $10 credit prize would have been awarded as the bonus symbol 35*a* is displayed in the bonus position 30*a* associated with the reel 12*b*. Likewise, if a Sun symbol 40 had been displayed on reel 12*c*, a major jackpot prize would have been awarded as the bonus MAJOR symbol 35*b* is displayed in the bonus position 30*b* associated with the reel 12*c*. The prizes or game enhancing elements awarded for any Sun symbols appearing in the associated reels 12*c*to 12*d* is in addition to any predetermined winning combinations of game symbols 10*a*, 10*f*, 10*g* that may be displayed on one of the pay lines 14 on the reels 12*a* to 12*e*. These winning combinations of game symbols 10*a*, 10*f*, 10*g* may either be two of a kind, three of a kind, four of a kind or five of a kind for all the game symbols 10*a*, 10*f* and other combinations of a "full house", "straight" or "flush" for the playing card game symbols 10*a*, the same as in the base game 8. The substitute Alien symbols 10*g* only substitute game symbols 10*a*, 10*f* for winning combinations on a player-selected pay line 14 and does not substitute for the Sun symbol 40. This means that an Alien symbol 10*g* cannot substitute for a Sun symbol 40 to trigger the award of a game enhancing element associated with the bonus symbols 35 displayed in the bonus positions 30*a* to 30*c*.

While the Sun symbol 40 also appears in reel 12*a*, as there is not any bonus position 30 associated with this reel, the game enhancing element associated with the bonus symbols 35*a* to 35*c* is not awarded.

Figure 5:
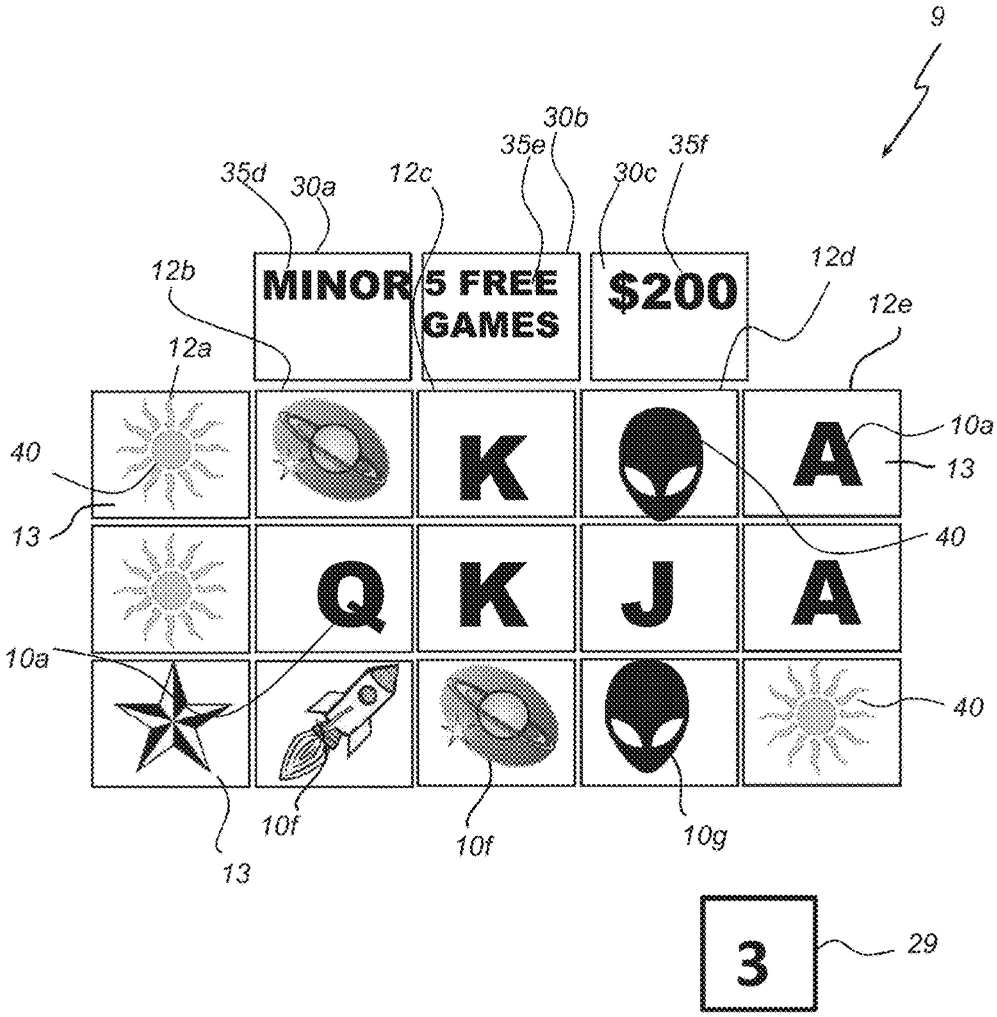

In the next free spin shown in FIG. 5, a MINOR bonus symbol 35*d* is displayed in the bonus position 30*a*, a 5 FREE GAMES bonus symbol 35*e* is displayed in the bonus position 30*b* and a $200 bonus symbol 35*f* is displayed in the bonus position 30*c*. However, the Sun symbols 40 appear only on reels 12*a* and 12*e*, which are not associated with the bonus positions 12*b* to 12*d*. Hence, none of these game enhancing elements (a Minor jackpot prize, five additional free spins and a $200 credit prize corresponding to bonus symbols 35*d*, 35*e* and 35*f*, respectively) are awarded to the player. Instead only predetermined winning combinations of symbols 10*a*, 10*f*, 10*g* that may be displayed on one of the pay lines 14 on the reels 12*a* to 12*e* will award prizes to the player. The free games counter 29 also shows that there are only three free spins left in the feature game 9.

Figure 6:
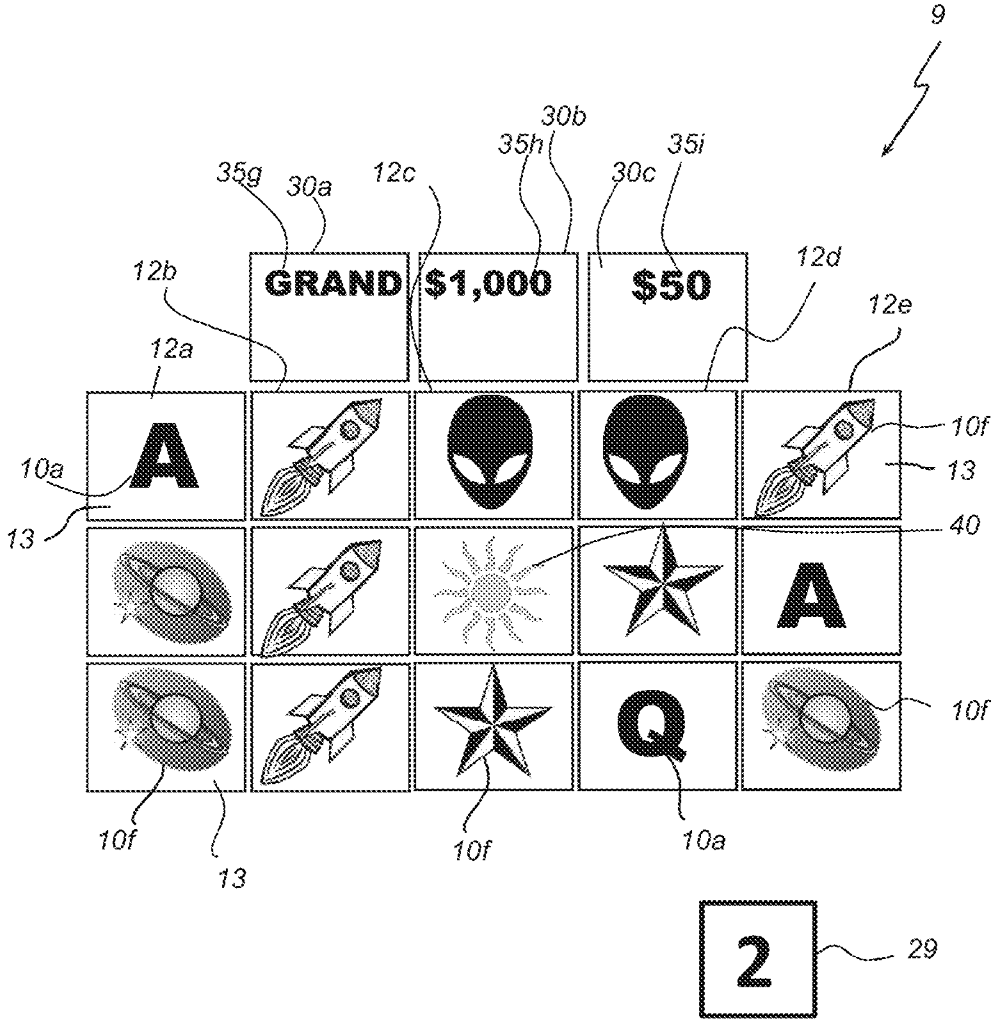

FIG. 6 shows the result of the next free spin, where a GRAND bonus symbol 35*g* is displayed in the bonus position 30*a*, a $1,000 bonus symbol 35*h* is displayed in the bonus position 30*b* and a $50 bonus symbol 35*i* is displayed in the bonus position 30*c*. Also, a Sun symbol appears in the middle game position of reel 12*c*. This means that the player is awarded a $1,000 credit prize corresponding to the $1,000 bonus symbol 35*h* displayed in the bonus position 30*b* associated with the reel 12*c*. The other game enhancing elements of a Grand jackpot prize and $50 credit prize are not awarded to the player.

Figure 7:
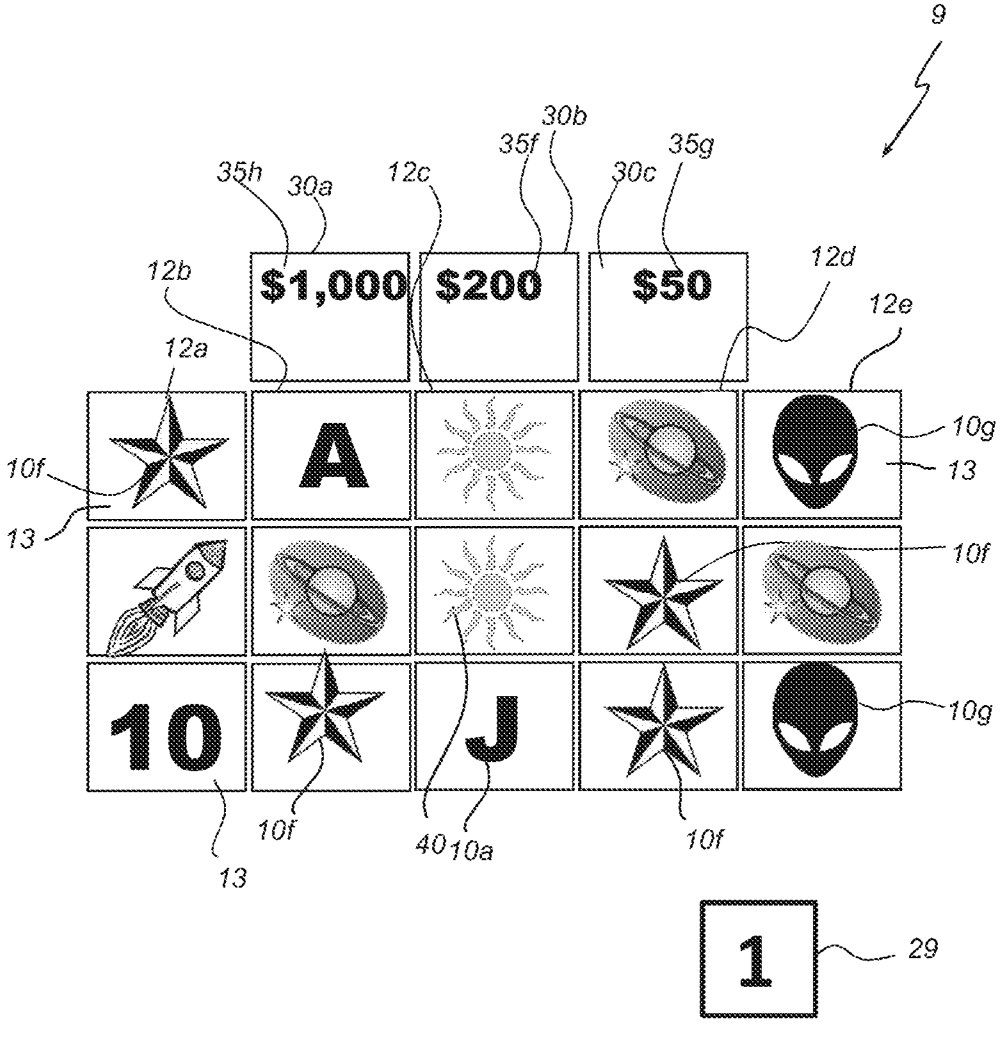

In FIG. 7, the result of the penultimate free spin is shown, where a $1,000 bonus symbol 35*h* is displayed in the bonus position 30*a*, a $200 bonus symbol 35*f* is displayed in the bonus position 30*b* and a $50 bonus symbol 35*g* is displayed in the bonus position 30*c*. Two Sun symbols 40 appear in reel 12*c*, which triggers the award of a $200 credit prize to the player, corresponding to the $200 bonus symbol 35*f* displayed in the bonus position 30*b*. In this embodiment, only one instance of the $200 credit prize is paid to the player, despite the additional Sun symbol 40 in the same reel 12*c*. However, in other embodiments, the $200 credit prize is paid for each display or appearance of the trigger Sun symbol 40 in the associated reel 12*c*.

Figure 8:
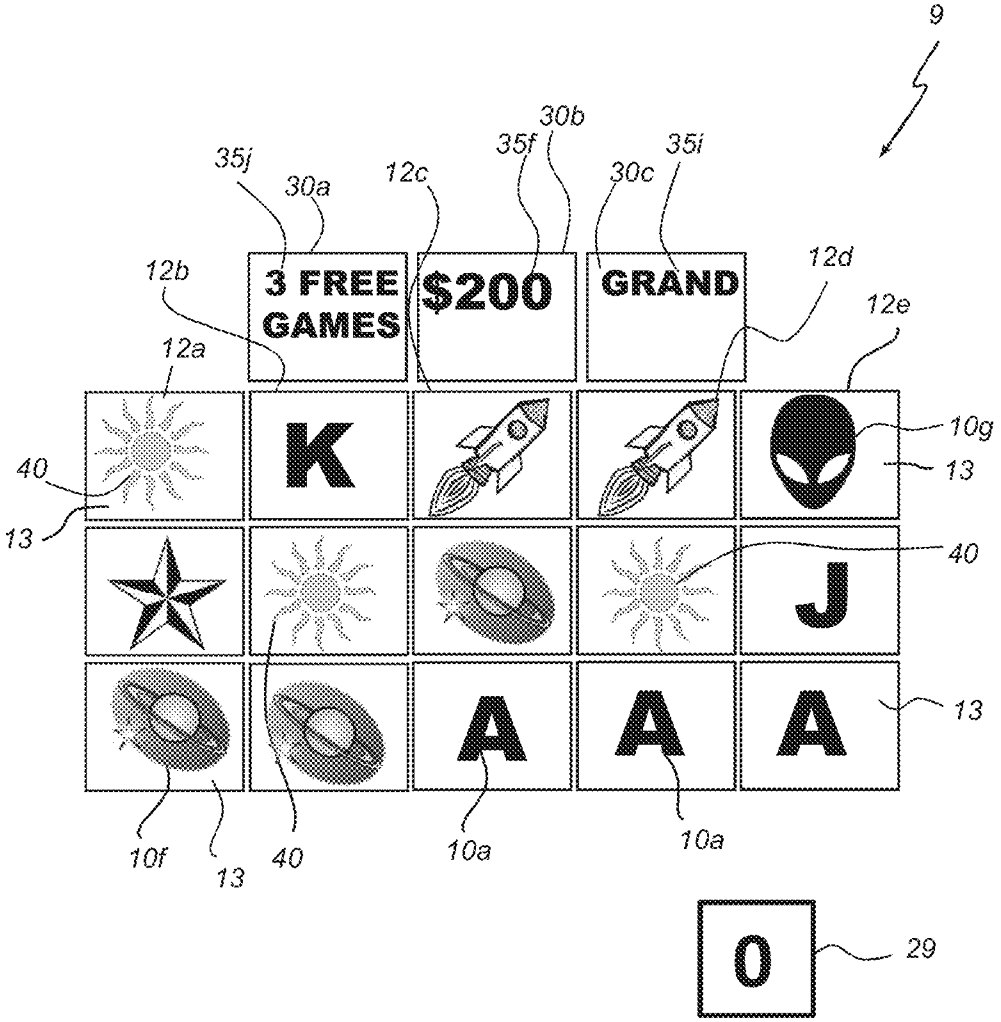

In the final free spin shown in FIG. 8, a 3 FREE GAMES bonus symbol 35*j* is displayed in the bonus position 30*a*, a $200 bonus symbol 35*f* is displayed in the bonus position 30*b* and a GRAND bonus symbol 35*g* is displayed in the bonus position 30*c*. A Sun symbol 40 appears in both reels 12*b* and 12*d*. Consequently, the player is awarded three free spins or games of the feature game 9 and the Grand jackpot prize corresponding to the 3 FREE GAMES bonus symbol 35*j* displayed in the bonus position 30*a* and the GRAND bonus symbol 35*g* displayed in the bonus position 30*c*. The free games counter 29 would be incremented up back to three to indicate that the player has been awarded this free games prize.

In other embodiments, the player may be awarded only one of the game enhancing elements, which either the player can choose or the electronic controller selects based on a stored hierarchy of prizes. In this case, the Grand jackpot prize would be awarded over the award of three free games.

It will be appreciated that in the invention, the game enhancing element associated with the bonus symbol 35 is awarded immediately and without any determination whether to award the prize. That is, once the trigger symbol 40 appears in the associated reel 12*b* to 12*d*, the electronic controller 4 must or always award the game enhancing element associated with the bonus symbol 35 displayed in the bonus position 30 associated with the reel 12*b* to 12*d* displaying the trigger symbol 40. There is no further determination, random or otherwise, whether to award the game enhancing element once the trigger condition has been met.

In some embodiments, different types of game enhancing elements are always displayed in the bonus positions 30*a* to 30*c*. For example, in FIG. 5, the bonus positions 30*a* to 30*c* display different types of game enhancing elements to each other—a jackpot-type prize, a free games-type game modifier and a monetary credit prize. In these embodiments, there would not be more than one instance of the same type of game enhancing element. For example, the display of two credit prizes in the bonus positions 30*a* and 30*c* shown in FIG. 4 would not be permitted.

In other embodiments, one or more of the bonus symbols 35*a* to 35*i* are held for display in the bonus positions 30*a* to 30*c* once triggered by the trigger symbol 40. This means that the same game enhancing element may be won multiple times in subsequent free games or spins. For example, the $1,000 bonus symbol 35*h* would be held for the next three free spins so that if the Sun symbol 40 were to appear in the reel 12*c* in a subsequent spin again, the $1,000 credit prize would be awarded to the player. A further variation of this embodiment permits the player to choose which bonus symbols 35*a* to 35*i* can be held in the bonus positions 30*a* to 30*c*, either at any time or only once the trigger symbol 40 triggers an initial award of the game enhancing element associated with the displayed bonus symbol 35*a* to 35*i*. This permission may be associated with an additional side bet or wager in addition to the initial wager made to play the base game 8.

In some embodiments, different types of game enhancing elements are associated exclusively with one of the bonus positions 30*a* to 30*c*. For example, the bonus position 30*a* may only display credit prize-type bonus symbols like the $10 bonus symbol 35*a*, the $250 bonus symbol 35*c*, $200 bonus symbol 35*f*, the $1,000 bonus symbol 35*h* and the $50 bonus symbol 35*i*, whereas the bonus position 30*b* only displays the jackpot-type bonus symbols, like the MAJOR bonus symbol 35*b*, the MINOR bonus symbol 35*d* and the GRAND bonus symbol 35*g*, and the bonus position 30*c* only displays the free games-type bonus symbols, such as the 5 FREE GAMES bonus symbol 35*e* and 3 FREE GAMES bonus symbol 35*j*.

In the embodiment described above, the amounts of the credit prizes awarded by the bonus symbols 35*a*, 35*c*, 35*f*, 35*h*, 35*i* increases as the bet multiplier increases, the bet multiplier being the amount bet by the player per pay line 14. For example, a bet multiplier of 2 means a bet of 2 credits per pay line 14, irrespective of the number of pay lines (2, 5, 10, etc.) that are selected to play the base game 8. Thus, the amounts of the credit prizes will only increase if the bet multiplier increases, irrespective of the amount of the total bet. Similarly, the probability of the jackpot prize being awarded through the jackpot-type bonus symbols 35*b*, 35*d*, 35*g* also increases with an increase in the total bet made by the player. This may be achieved by using different reel strips with a greater number of jackpot-type bonus symbols 35*b*, 35*d*, 35*g* on for the reels 12*b* to 12*d*.

In some embodiments, the same trigger symbol 40 for awarding the game enhancing element associated with the bonus symbols 35 is used to trigger the feature game 9 from the base game 8. In these embodiments, the feature game 9 is triggered by the appearance of three, four or five trigger symbols 40 in the base game 8 on any player-selected pay line 14 or on the same player-selected pay line.

It will be appreciated that the above described game enhancing elements in FIGS. 4 to 8 are not exhaustive and that other game enhancing elements may be provided. Hence, in some embodiments, the game enhancing element comprises at least one or more a win multiplier, wild multipliers, bonus wilds, symbols that cause the award of additional free games, trigger symbols to retrigger the at least two second arrays, held columns, random wild symbols, stacked symbols, bonus symbols, new game symbols, reveal symbols, progressives, bonus credits, jackpot symbols, and one or more symbol replacements. A variety of game enhancing elements can be awarded by the bonus symbols, including:

- symbols that award a predetermined number of free plays of the game;
- win multiplier symbols that multiply the amount of any win from one of the predetermined winning combinations;
- "wild" symbols that cause the display of substitute symbols in randomly selected symbol positions;
- bonus symbols that awards a bonus prize, either as a monetary amount or as a bonus credit;
- wild multiplier symbols that cause the display of substitute symbols on the array 11 and multiplies the amount of any win from one of the predetermined winning combinations;
- bonus wild symbols that cause the display of substitute symbols on the array 11 and awards a bonus prize;
- symbols that cause the award of additional free plays of the game;
- symbols that cause one or more of the symbol positions to be held static (typically one or more reels 12*a* to 12*e*) and display substitute symbols on the array 11;
- symbols that cause the same game symbol to be stacked in a group of symbol positions, typically the group being one or more reels 12*a* to 12*e;*
- symbols that cause the display of new game symbols on the array 11;
- "reveal" symbols that cause a game symbol to reveal another game symbol; and
- "replacement" symbols that cause one or more game symbols to be replaced by other game symbols in the array 11.

These types of bonus symbols do not modify the function or value of the game symbols 10 that appear on the arrays 11, but instead confer bonus prizes, free games or change existing game symbols for other game symbols (such as replacing picture, royal card or symbols belonging to a reel with wild/substitute symbols). Where the function of game symbols 10 have been changed or the game symbols 10 are replaced, then this modification can take effect with the next play of the game instead of applying to the result of the spun array 11. In another embodiment, the bonus symbols may indicate the duration in which its game enhancing element is applied, such as a predetermined number of spins or a predetermined time period.

It will be appreciated that in other embodiments, the game enhancing elements can also be awarded as a separate aspect of the games 8, 9. The game enhancing elements may further be awarded in addition or as an alternative to the enhanced prizes awarded based on winning combinations of game symbols 10 in the games 8, 9. In a further embodiment, the award of game enhancing elements can be done by way of a sixth reel or the appearance of game enhancing symbols different to the bonus symbols 35 in the reels 12*a* to 12*e*. The sixth reel in this case is simply added as an extension to the array 11 and spins either game enhancing symbols or "blank" symbols.

In some embodiments, the game may include "collector"-type symbols which award points or tokens. The collection of points or tokens during the base game 8 and/or feature game 9 leads to the trigger of additional prizes or game enhancing symbols, depending on the number of points or tokens that are collected. These additional prizes can include stand alone progressive jackpots, bonus prizes and super games, which are enhanced versions of free spins or games where there are greater pay outs or frequency of wins.

In other preferred forms, the game enhancing element can be an enhanced version of the array 11. The enhanced array may provide additional game enhancing symbols that include the award of points or an additional number of free spins of the array 11 (for example, retriggering 5 more free spins). The collection of points awarded by the enhanced array during free spins or game leads to the trigger of additional prizes or game enhancing symbols, depending on the number of points that are collected. These additional prizes can include stand alone progressive jackpots, bonus prizes and super games, which are enhanced versions of free spins or games where there are greater pay outs or frequency of wins. In addition, the enhanced array has a different visual representation to the array 11. In addition, the enhanced array may provide game enhancing symbols of greater value and/or frequency compared to the array 11.

Where the game enhancing element comprises the award of a jackpot prize, such as the Minor, Major and Grand jackpots in FIGS. 4 to 8, it can take the form of a standalone progressive jackpot, fixed jackpot, symbol driven jackpot and any combination thereof (i.e. a mixture of different types of jackpots). In some embodiments, the jackpots are limited to the feature game 9. In other embodiments, the jackpots are shared by all the games 8 and 9. That is, the jackpots could be won through play of the games 8 and, 9.

A progressive jackpot prize takes a portion of each bet (typically a set percentage of each bet) made on the gaming machine and thus the amount of the progressive jackpot incrementally increases as more bets are made on the gaming machine 1. The progressive jackpot is typically awarded when a winning game combination associated with the jackpot occurs in the game played on the gaming machine. In many cases, progressive jackpots are associated with the least probable winning combination and are commonly the highest paying award of the gaming machine. In other cases, a separate trigger event can be used to award the progressive jackpot prize, such as a special jackpot symbol, a trigger event internally generated by the electronic controller. Alternatively, or additionally, once a certain threshold is met, either a certain amount that has been bet on the gaming machine or the incremented amount of the progressive jackpot, a trigger event is activated in the electronic gaming machine to pay out the progressive jackpot prize. Progressive jackpot prizes also tend to be shared amongst multiple gaming machines so as to increase the amount of the progressive jackpot prize and hence increase player interest in playing one of the electronic gaming machines. In some gaming machines, more than one jackpot or progressive jackpot are offered by the gaming machine or gaming machines linked together.

Separate jackpot or bonus prizes may also be provided, such as mystery jackpots rather than the symbol driven jackpots awarded through the bonus symbols 35*g*, 35*d* and 35*g* in the bonus positions 30*a* to 30*c*. That is, none of the symbols in the game trigger the jackpot; hence the trigger event is a "mystery". By way of comparison, a standard jackpot is typically symbol driven in that a particular combination of symbols must occur in the game to trigger the standard jackpot.

The trigger event for the mystery jackpot can be one randomly generated by the electronic controller 4 for each play of the games 8 and 9. One way to implement the random determination of the trigger event is for the electronic controller 4 to internally generate a random number and check if it is a predetermined number or within a predetermined range of numbers that will initiate the appearance of the trigger symbols. For example, the predetermined range of numbers could be the range of numbers between 1 and 10 and the electronic controller 4 internally generates a random number between 1 and 100. If the generated number is any one of numbers 1 to 10, then this results in the electronic controller 4 causing the trigger event to occur and award the progressive jackpot prize. It will be appreciated that this manner of determining the trigger event may also be used to determine whether the feature game 9 is triggered in the base game 8.

Progressive jackpots can be confined to the gaming machine 1 as so called "standalone" progressive jackpots. Alternatively, the jackpot is a wide area or an in-house linked progressive jackpot prize. In other embodiments, one or more the progressive jackpot prizes are configured to be part of a wide area or in-house linked progressive jackpot prize. In other words, the progressive jackpot prizes can be awarded on a group of networked gaming machines in a specified area or a group of specified gaming machines that are linked together for jackpot purposes (usually via a central jackpot controller). The jackpot prizes can also be shared with any other games offered on the same gaming machine 1 (as in multi-game gaming machines).

During play of the games 8 and 9, the electronic controller 4 will determine whether the trigger event for the jackpot has occurred. In response to the occurrence of the jackpot trigger event(s), the electronic controller 4 transmits a signal to the video screen 7 to cause the jackpot(s) associated with the jackpot trigger event(s) to be awarded to the player. After the jackpot(s) are awarded, the amounts for any awarded jackpots are reset. The amounts of the jackpots that have been won can be reset either to a predetermined start amount or simply increment upwardly from zero where the won jackpot is a progressive jackpot.

In some embodiments, the in-game trigger event is determined at the end or during the play of the game; i.e. at the end or during a spin of the reels 12. In some embodiments, the in-game trigger event occurs in a preceding play of the game so that the result of the in-game trigger event takes place in a subsequent play of the game, typically the next play of the game after the preceding play but could include a later successive play of the game.

Figure 9:
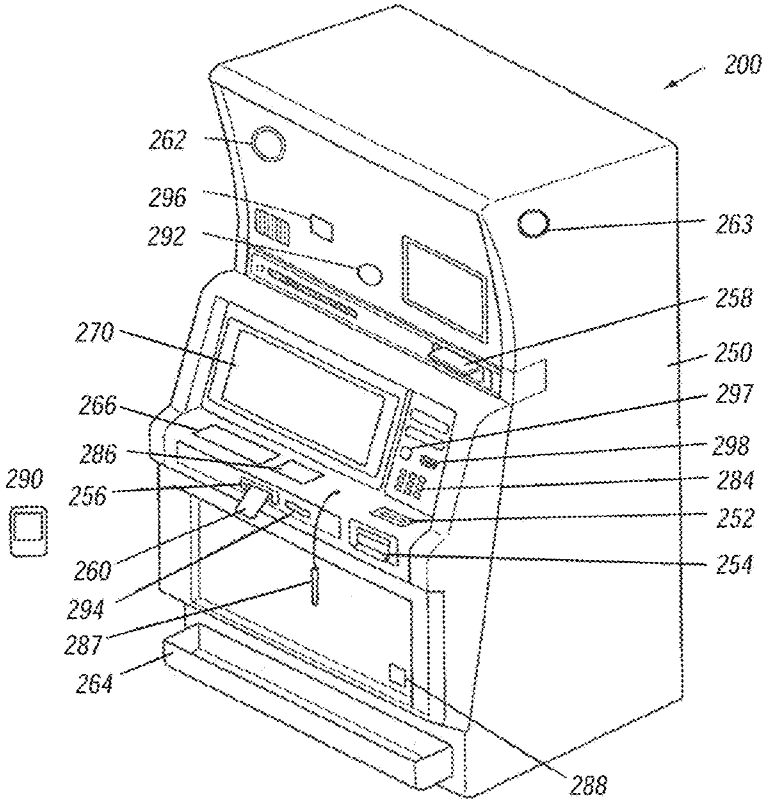
FIG. 9 is a perspective view of an electronic gaming machine according to yet another embodiment of the present disclosure.

Referring to FIG. 9, another embodiment of the invention is shown in the form of an electronic gaming machine 200. The electronic gaming machine 200 may include a housing or cabinet 250 and one or more value transfer mechanisms or devices, which may include a coin slot or acceptor 252, a paper currency or bill acceptor 254, a ticket reader/printer 256 and a card reader 258, which may be used to input value to the electronic gaming machine 200. A value transfer device may include any device that can accept value from a player. The topper (not shown) may be mounted to the top of the electronic gaming machine 200.

If provided on the electronic gaming machine 200, the ticket reader/printer 256 may be used to read and/or print or otherwise encode ticket vouchers 260. The ticket vouchers 260 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 260 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 260 could be printed with an optically readable material such as ink, or data on the ticket vouchers 260 could be magnetically encoded. The ticket reader/printer 256 may be provided with the ability to both read and print ticket vouchers 260, or it may be provided with the ability to only read or only print or encode ticket vouchers 260. In the latter case, for example, some of the electronic gaming machines 200 may have ticket printers 256 that may be used to print ticket vouchers 260, which could then be used by a player in other electronic gaming machines 200 that have ticket readers 256.

If provided, the card reader 258 may include any type of card reading device, such as a magnetic card reader or an optical card reader, and may be used to read data from a card offered by a player, such as a credit card or a player tracking card. If provided for player tracking purposes, the card reader 258 may be used to read data from, and/or write data to, player tracking cards that are capable of storing data representing the identity of a player, the identity of a casino, the player's gaming habits, etc.

The electronic gaming machine 200 may include one or more audio speakers 262, a coin payout tray 264, an input control panel 266, and a colour video display unit 270 for displaying images relating to the game or games provided by the electronic gaming machine 200. The audio speakers 262 may generate audio representing sounds such as the noise of spinning reels, a dealer's voice, music, announcements or any other audio related to a game. The input control panel 266 may be provided with a plurality of pushbuttons or touch-sensitive areas that may be pressed by a player to select games, make wagers, make gaming decisions, etc.

Figure 10:
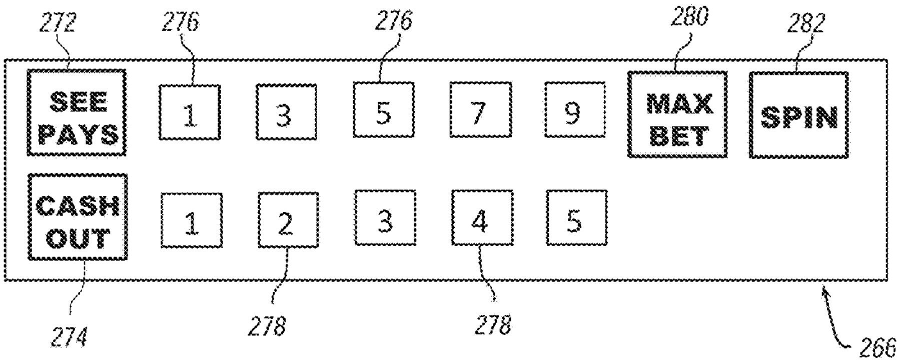
FIG. 10 is a schematic drawing of a control panel for the electronic gaming machine of FIG. 9.

FIG. 10 illustrates one possible embodiment of the control panel 266, which may be used where the electronic gaming machine 200 having a plurality of reels. The control panel 266 may include a "See Pays" button 272 that, when activated, causes the display unit 270 to generate one or more display screens showing the odds or payout information for the game or games provided by the electronic gaming machine 200. As used herein, the term "button" is intended to encompass any device that allows a player to make an input, such as an input device that must be depressed to make an input selection or a display area that a player may simply touch. The control panel 266 may include a "Cash Out" button 274 that may be activated when a player decides to terminate play on the electronic gaming machine 200, in which case the electronic gaming machine 200 may return value to the player, such as by returning a number of coins to the player via the payout tray 264.

The control panel 266 may be provided with a plurality of selection buttons 276, each of which allows the player to select a different number of pay lines prior to spinning the reels. For example, five buttons 276 may be provided, each of which may allow a player to select one, three, five, seven or nine pay lines.

The control panel 266 may also be provided with a plurality of selection buttons 78 each of which allows a player to specify a wager amount for each pay line selected. For example, the electronic gaming machine 200 may be provided with five selection buttons 78, each of which may allow a player to select 1¢, 2¢, 5¢, 10¢ and 20¢, to wager for each pay line selected. In that case, if a player were to activate one of the buttons 276 to select five pay lines and then activate one of the buttons 278 to select 5¢ per pay line to be wagered or bet, the total wager would be $0.25.

The control panel 266 may include a "Max Bet" button 280 to allow a player to make the maximum wager allowable for a game. In the above example, where up to nine pay lines were provided and up to 20¢ could be wagered for each pay line selected, the maximum wager would be $1.80 The control panel 266 may include a spin button 282 to allow the player to initiate spinning of the reels after a bet has been made.

In FIG. 10, a rectangle is shown around the buttons 272, 274, 276, 278, 280, 282. It should be understood that the rectangle simply designates, for ease of reference, an area in which the buttons 272, 274, 276, 278, 280, 282 may be located. Consequently, the term "control panel" should not be construed to imply that a panel or plate separate from the housing 250 of the electronic gaming machine 200 is required, and the term "control panel" may encompass a plurality or grouping of player activatable buttons.

Although one possible control panel 266 is described above, it should be understood that different buttons could be utilized in the control panel 266, and that the particular buttons used may depend on the game or games that could be played on the electronic gaming machine 200. Although the control panel 266 is shown to be separate from the display unit 270, it should be understood that the control panel 266 could be generated by the display unit 270. In that case, each of the buttons of the control panel 266 could be a coloured area generated by the display unit 270, and some type of mechanism may be associated with the display unit 270 to detect when each of the buttons was touched, such as a touch-sensitive screen.

As noted above, the electronic gaming machine 200 may include a mechanism by which the electronic gaming machine 200 may determine the identity of the player. In particular, the card reader 258 may be used to read a card that carries an identification code that may be uniquely associated with the player so that the gaming unit can differentiate that player from all other players, or so that the gaming unit can differentiate that player as a member of a group of players from all player not a member of the group of players. The electronic gaming machine 200 may also include equipment, such as a keypad 284, an input pad 286 (with optional stylus 287), a port (or antenna) 288 adapted to communicate via a wired or wireless link (infrared or radio frequency link, for example) to a mobile electronic device 290 (such as a personal digital assistant, smart phone or tablet), a camera 292, a scanner 294, a retinal (or iris) scanner 296, fingerprint scanner 297, and/or a microphone 298. The electronic gaming machine 200 may include any one of the devices 258, 284, 286, 288, 290, 292, 294, 296, 297, 298, or the electronic gaming machine 200 may include a combination of some or all of the devices 258, 284, 286, 287, 288, 290, 292, 294, 296, 297, 298.

In operation, a player may identify him or herself to the electronic gaming machine 200 by entering a unique numeric or alpha-numeric code using the key pad 284, for example. Alternatively, the player may use his or her finger or the stylus 287 to sign his or her signature on the input pad 286. As a further alternative, the player may sign his or her signature on the mobile electronic device 290, which signature is then converted to electronic data, and the data is then transferred via the port/antenna 288 to the electronic gaming machine 200. As yet another alternative, the player may sign his or her signature on a piece of paper that is then photographed using the camera 292 or scanned using the scanner 294 (or the bill acceptor 254) to convert the signature into electronic data. As an additional alternative, the player may place one of his or her fingers or his or her hand on the scanner 297, and the scanner 297 may generate an electronic data representation of the fingerprint on one or more of the player's fingers or an electronic data representation of the pattern of the entire hand. Alternatively, the camera 292 may be used to take a picture (live or still) of the player, the picture then being converted into electronic data. As a still further alternative, the player may place his or her eye up to the retinal (or iris) scanner 296, and the retinal (or iris) scanner 296 may generate an electronic data representation corresponding to the pattern of the retina (or iris) of the player. As yet another alternative, the player may speak into the microphone 298, and characteristics of the spoken words (or voiceprint) may be converted into an electronic data representation.

Figure 11:
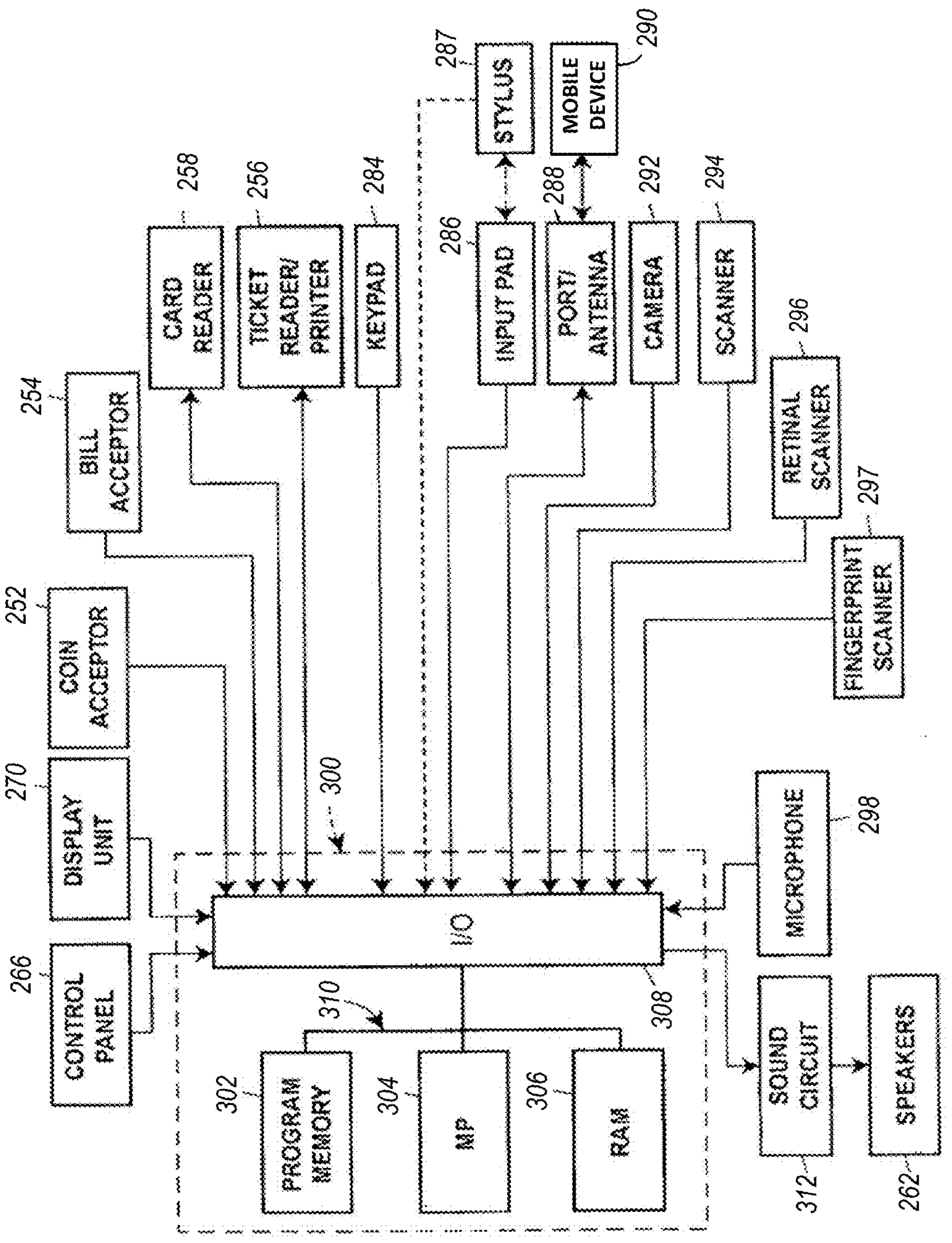
FIG. 11 is a block diagram of the electronic components of the electronic gaming machine of FIG. 9.

FIG. 11 is a block diagram of a number of components that may be incorporated in the electronic gaming machine 200. Referring to FIG. 11, the electronic gaming machine 200 may include a controller 300 that may comprise a program memory 302, a microcontroller or microprocessor (MP) 304, a random-access memory (RAM) 306 and an input/output (I/O) circuit 308, all of which may be interconnected via an address/data bus 310. It should be appreciated that although only one microprocessor 304 is shown, the controller 300 may include multiple microprocessors 304. Similarly, the memory of the controller 300 may include multiple RAMs 306 and multiple program memories 302. Although the I/O circuit 108 is shown as a single block, it should be appreciated that the I/O circuit 308 may include a number of different types of I/O circuits. The RAM(s) 304 and program memories 302 may be implemented as semiconductor memories, magnetically readable memories, and/or optically readable memories, for example.

FIG. 11 illustrates that the coin acceptor 252, the bill acceptor 254, the ticket reader/printer 256, the card reader 258, the control panel 266, the display unit 270, the keypad 284, the input pad 286 (and optionally the stylus 287), the port/antenna 288, the digital camera 292, the scanner 294, the retinal scanner 296, the fingerprint scanner 297 and the microphone 298 may be operatively coupled to the I/O circuit 308, each of those components being so coupled by either a unidirectional or bidirectional, single-line or multiple-line data link, which may depend on the design of the component that is used. The speaker(s) 262 may be operatively coupled to a sound circuit 312, that may comprise a voice- and sound-synthesis circuit or that may comprise a driver circuit. The sound-generating circuit 312 may be coupled to the I/O circuit 308.

As shown in FIG. 11, the components 252, 254, 256, 258, 266, 270, 284, 286, 287, 288, 292, 294, 296, 297, 298, 312 may be connected to the I/O circuit 308 via a respective direct line or conductor. Different connection schemes could be used. For example, one or more of the components shown in FIG. 10 may be connected to the I/O circuit 308 via a common bus or other data link that is shared by a number of components. Furthermore, some of the components may be directly connected to the microprocessor 304 without passing through the I/O circuit 308.

Furthermore, the embodiments of the invention have been described as providing a standard 5×3 array for the base game 8 and the feature game 9. However, it will be appreciated that in other embodiments, the size and shape of the base game array 11 and feature game array may vary as desired. For example, the arrays 11 could take any number of different shapes, such as triangular, circular, square, hexagonal, hemispherical or other polygonal shapes. For example, the base game array 11 could comprise a circular array having three rings (equivalent to rows) like a bullseye target segmented into five columns. The feature game array would then expand into additional rings surrounding the initial rings of the base game array 11. Alternatively, the arrays 11 could have an unequal number of rows or columns. For example, the reels 12*a*, 12*b* could have three rows, but the reels 12*c* to 12*e* could have four rows.

While the preferred embodiment of the invention has been described in relation to a feature game 9, those skilled in the art will appreciate that the use of the bonus positions 30*a* to 30*c* to award game enhancing elements can readily be applied to the base game 8 alone or to both a base game 8 and a feature game 9.

In some embodiments, the frequency of the trigger symbol 40 is controlled by choosing different reel strips to display the game symbols 10 in the base game 8. Thus, more trigger symbols appear on the reels 12 as the bet made by the player increases. This means that the frequency of awarding a game enhancing element increases. There may also be a combination of frequency of the trigger symbol and using different reel strips with different bonus prizes. Other embodiments may use a free spins bonus where the bonus or jackpot prize values are determined by the player's initiating bet multiplier as well as which free spin is being played or by how many trigger symbols have been collected or accumulated in the free spins so far.

In some embodiments, the gaming machine comprises an input device for receiving commands from the player to play the game, wherein the input device comprises one or more buttons in electronic communication with the controller to transmit the player commands to the controller.

In some embodiments, the input device comprises one or more buttons on the housing, the buttons being in electronic communication with the controller. In other embodiments, the buttons are arranged on a console of the housing. Alternatively or additionally, the input device comprises a touch sensitive surface on the display for receiving commands from the player, the touch sensitive surface being in electronic communication with the electronic controller to transmit the player commands to the controller.

In some embodiments, the gaming machine comprises a value transfer mechanism for receiving value from the player to make a bet and initiate a play of the game. In other embodiments, the value transfer mechanism also pays the prizes to the player using value in an amount equal to an awarded prize. It is further preferred that the housing comprises the value transfer mechanism. In one embodiment, the value transfer mechanism comprises one or more vending slots for paying and/or receiving value. In other embodiments, the value transfer mechanism comprises a value input/value output device. In further embodiments, the value transfer mechanism comprises a coin slot or acceptor, a paper currency or bill acceptor, a ticket reader and/or printer or a card reader and/or writer.

Preferably, the bonus positions are associated with groups in the array. In some embodiments, the bonus positions are each adjacent to its associated group. In other embodiments, the bonus positions are located above the array, each bonus position being adjacent to its associated group.

Preferably, there is a bonus position for each group in the array. Alternatively, there are less bonus positions than groups in the array. In one embodiment, each bonus position is associated with at least one reel. In some embodiments, there are at least three bonus positions in the array and the groups comprise reels in the array. In other embodiments, there are at least three bonus positions in the array and the groups comprise reels in the array, wherein each bonus position is associated with at least one reel. In a further embodiment, there are five reels in the array and three bonus positions associated with the middle three reels in the array.

In some embodiments, where there is more than one bonus position and the trigger symbol appears in more than one group, the controller must award each game enhancing element associated with the bonus symbols displayed in the bonus positions associated with the groups which display the trigger symbol. In other embodiments, where there is more than one bonus position and the trigger symbol appears in more than one group, the controller must award the game enhancing element having the highest value of the game enhancing elements associated with the bonus symbols displayed in the bonus positions associated with the groups which display the trigger symbol. In a further embodiment, the controller is configured to store a hierarchy of values for the game enhancing elements associated with the bonus symbols.

In some embodiments, where more than one trigger symbol appears in the same group of game positions, the controller must award only one instance of the game enhancing element associated with the bonus symbol displayed in the bonus position associated with the group which displays the trigger symbol. In other embodiments, where more than one trigger symbol appears in the same group, the controller must award the game enhancing element for each trigger symbol displayed in the same group.

In some embodiments, the bonus symbols displayed in the bonus positions change between plays of the game. In other embodiments, the bonus symbol, which was displayed in the bonus position associated with the at least one group and which is associated with the awarded game enhancing element, is displayed in the same bonus position for one or more subsequent plays of the game.

In some embodiments, the bonus positions each display a bonus symbol that awards a different type of game enhancing element for any one play of the game. In other embodiments, each bonus position is associated with a different type of game enhancing element.

In some embodiments, the game enhancing elements comprise at least one or more of a predetermined number of free games, a win multiplier, wild multipliers, bonus wilds, symbols that cause the award of additional free games, trigger symbols to retrigger the game, held columns, random wild symbols, stacked symbols, bonus symbols, new game symbols, reveal symbols, progressives, bonus credits, jackpot symbols, and one or more symbol replacements.

Preferably, the groups comprise reels in the array. In some embodiments, the array comprises five reels. In other embodiments, the reels each comprise three game positions.

Preferably, the one or more of the configurations of the randomly selected game symbols are arranged along a pay line associated with a game outcome. In some embodiments, a play of the game comprises a plurality of randomly selected game symbols arranged in a plurality of reels, one or more of the configurations of the randomly selected game symbols arranged along a pay line being associated with a game outcome, the game outcome being associated with a value award payable to a player.

In some embodiments, the controller comprises an electronic controller coupled to the display. In other embodiments, the controller comprises an electronic controller coupled to at least one electronic video display.

In some embodiments, each the game position comprises a reel separate to the other game positions. That is, each game or symbol position 13 comprises its own individual reel and three of the reels are grouped into columns 12*a* to 12*e* of reels. That is, each symbol position 13 has its own individual reel strip of game symbols.

In other embodiments, the gaming machine 1 also offers the player the opportunity to play in community games against other players in so-called tournament games, or even in player versus player games. This is typically implemented by electronically linking several gaming machines 1 in a group within a gaming venue. The player versus player or tournament game can be played simultaneously by the players or can be staggered, with some players playing at one time and some players playing at another time in the same game. In this situation, the player versus player or tournament game comprises the award of an additional bonus prize in addition to the jackpot prizes in the selected available jackpot set.

While the same game format is essentially used across the base game 8 and feature game 9, it will be appreciated that the game format may vary across the base and feature games, as well as between base games where more than one game is offered by the same electronic gaming machine 1. For example, one of the games 8 may be a wheel-type game or a four reel game and another of the games may be a standard five reel game. Similarly, the games 8 may each have different game symbols, game rules and pay tables that are unique to each game.

While one embodiment of the invention has been described in relation to a base game 8 and a feature game 9, it will be appreciated that the invention could include one or more additional feature games that are triggered by specific trigger symbols appearing in the feature game 9. Also, the additional feature games may also have trigger symbols that trigger further feature games in a cascading fashion. These additional and further feature games could have the same game play elements as the feature game 9 or be different feature games entirely.

In some embodiments, the array (including the base game array and/or the feature game array) take any one of a circular, triangular, oval, semi-circular, hexagonal, pentagonal, octagonal, non-rectangular or polygonal shape. In some embodiments, the base game array is different in size and/or dimensions to the feature game array. In other embodiments, the feature game array is greater in size than the base game array. In one preferred form, the base array comprises three rows and five columns and the feature game array comprises either more than three rows or more than five columns. In a further preferred form, the feature game array is an extended base game array.

In some embodiments, a feature game trigger event occurs in the base game to trigger the feature game. In one embodiment, the feature game trigger event comprises a random event determined by the electronic controller at the start of play of the feature game. In another embodiment, the feature game trigger event comprises the appearance of at least one trigger symbol in the base game array. In another alternative, the feature game trigger event comprises an in-game event during play of the base game.

In other embodiments, the base game 8 and the feature game 9 need not be displayed alternately on a single video screen 7. Instead, they may be displayed on the same video screen 7, with the base game 8 shown in the lower playing area 7*a* and the feature game 9 shown in the upper display area of the video screen 7. Alternatively, the base game 8 and the feature game 9 are shown on separate video screens, with the base game 8 shown in a lower video screen corresponding to the lower playing area 7*a* and the feature game 9 shown in an upper video screen corresponding to the upper display area. Also, the order can be reversed, with the lower playing area 7*a* or video screen showing the feature game 9 and the upper video screen or upper playing area of a single video display screen 7 showing the base game 8.

In another embodiment, the video screen 7 is a touch screen for use in addition to the player-actuatable buttons 6 so as to enable the player to select the bet level (such as bet denominations or bet per pay line 14) as well as other various features, such as making monetary bets for the game, initiating play of any base and feature games played and responding to any messages or requests issued on the gaming machine 1 by the electronic controller 4. In this case, the player may control when the reels 12 start spinning and stop spinning, either individually or collectively, by simply touching the reels 12. Control over spinning of the reels 12 can also be implemented through the buttons 6 on the console 3. This increases player interaction and provide the player with an opportunity to guess when a particular game symbol 10 may appear in the reels 12.

In some embodiments, in response to a feature game trigger event in the base game, the controller causes the display to display game symbols for playing the feature game. Alternatively, the controller causes the display of the feature game and the base game during play of the base game, the feature game being inactive until triggered. In this embodiment, the change in the feature game from being inactive to active may be indicated on the display. This indication may be visual, aural or a combination of both.

In some embodiments, the player selectively starts and/or stops play of the base game array and/or the feature game array.

In some embodiments, the gaming machine comprises a mobile electronic gaming device. In other embodiments, the mobile electronic gaming device comprises a handheld electronic device. In one preferred form, the handheld electronic device comprises a handheld electronic gaming device or a smart phone. Alternatively, the gaming machine comprises a computer. In other embodiments, the computer is connected to a communication network.

In some embodiments, the game symbols may be used to play a slots-type game. In other embodiments, the game symbols may be used to play a poker-type game. In still other embodiments, the game symbols may be used to play a bingo or keno-type game.

The electronic controller 4 may randomly select the game symbols that appear in or on the array (e.g., using a random number generator, which may be incorporated into the machine 1, for example in the electronic controller 4), each column of the array corresponding to a reel in a mechanical or electromechanical display, and provide an award based on the randomly selected configuration. Alternatively, the machine 1 (or a server associated with the machine 1) may select an outcome from a pool of outcomes, and the machine 1 may display a configuration of symbols in accordance with that outcome, and provide an award in accordance with the outcome.

It will be appreciated that while the preferred embodiments have been described in relation to an industry standard electronic gaming machine, the invention can be readily applied to other types of electronic gaming machines, including a personal computer (standing alone or connected to a communications network, LAN or WAN), mobile electronic devices (such as handheld or portable electronic devices like tablets and smart phones) and other electronic devices capable of displaying a game. In the case of mobile electronic device, in one arrangement it may permit the player to make bets using "virtual" credits that represent a monetary value, but do not require the player to make a monetary transaction. Instead, the invention may provide a tiered access to the various features of the game so that the player can make relatively small payments to access particular features of the game or obtain additional benefits during game play. An alternative arrangement would require the player to purchase virtual credits or tokens via an interface on the mobile electronic device or an online interface accessible by the mobile electronic device. Similarly, either of the above described arrangements can be applied where the invention is implemented on a personal computer (PC) connected to the internet (wirelessly or not). In one example of the implementation, the PC would access an online casino over the internet to play the game of the invention or the game of the invention would be part of a social networking website. It is also contemplated that the player could also make regular payments to subscribe to continue playing the game on the mobile electronic device, PC or other electronic device.

In an alternative embodiment, the gaming machine also provides an option for the player to play with either credits based on a monetary amount or virtual credits as discussed above. This can be implemented by way of a selection menu prior to playing the selected game or by providing a suitable menu button on screen during play of the selected game.

In another aspect, the invention includes a computer program configured to perform the invention. In this way the invention can be implemented in various ways on a gaming machine. In a further aspect, the invention includes a gaming system configured comprising a central processing unit (such as a computer or computational processor) configured for communication with a gaming machine to perform the invention. In a yet another aspect, the invention includes a non-transitory computer readable or carrier medium carrying computer executable code that, when executed on a central processing unit configured for communication with a gaming machine, causes the central processing unit to perform the invention. In this case, the non-transitory carrier medium includes an external hard drive, a memory device, including a memory card, smart card, a radio frequency identification (RFID) device, USB key, magnetic card or other electronic storage device.

While the illustrated embodiments include an electronic display on which the array of game positions is displayed, it will be recognized that the disclosed embodiments could instead incorporate mechanical or electro-mechanical reels to define the array of game positions. In fact, to the extent that the game positions, game symbols or operation of the gaming machine described herein would require a modification of such mechanical or electro-mechanical reels, it will be recognized that the embodiment represents a change in the structure or operation of a machine, rather than simply a variation in the rules of playing a game. In addition or in the alternative, the variation in the game positions, game symbols or operation of the gaming machine described herein may be viewed as analogous to a method for utilizing a new game apparatus (like a new deck of cards), rather than simply as a new set of rules in and of themselves.

It will further be appreciated that any of the features in the preferred embodiments of the invention can be combined together and are not necessarily applied in isolation from each other. For example, the feature of the player being able to selectively starting or stopping spinning of the reels 12 and the feature of providing separate video screens for the lower playing area **7*a* and upper display area 7*b* can be combined into a single gaming machine 1**. Similar combinations of two or more features from the above described embodiments or embodiments of the invention can be readily made by one skilled in the art.

By providing bonus positions to display bonus symbols that trigger the award of game enhancing elements upon the trigger symbol appearing in the associated group of game positions, the award of game enhancing elements is performed efficiently and in an entertaining manner to the player. This improved operation of the gaming machine increases the player's interest as there is more chance of winning additional prizes due to the award of these game enhancing elements. The invention also adds greater value to a player in terms of the probability of winning a prize and providing greater variety in game play, especially compared to a conventional gaming machine that only has one set of reels and a single feature game. All these advantages of the invention result in the player being more likely to retain interest in continuing to play the same gaming machine due to the variation in game play on the gaming machine. Furthermore, since the controller controls operation of the gaming machine, the invention can be readily implemented to existing gaming machines, including EGMs, electro-mechanical or purely mechanical gaming machines as well as other gaming systems. In all these respects, the invention represents a practical and commercially significant improvement over the prior art.

In conclusion, although the preceding text sets forth a detailed description of different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '__________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The invention claimed is:

1. A gaming machine comprising:

a display for displaying a game, and;

a controller for controlling the display of the game symbols on the display; and a value transfer mechanism for receiving value from the player, wherein the controller is in communication with the value transfer mechanism and the value transfer mechanism comprises at least one of a coin acceptor and a paper currency acceptor;

wherein the controller is configured to:

determine if a wager has been received via the value transfer mechanism;

display a play of the game on the display including one or more configurations of game symbols if the wager has been received, one or more of the configurations of game symbols being associated with a game outcome, the game outcome being associated with a value award payable to a player;

provide an array of game positions in which to display the one or more configurations of game symbols; the game positions being arranged into one or more groups;

provide one or more bonus positions, the bonus positions each displaying a bonus symbol associated with a game enhancing element;

associate at least one bonus position with at least one group;

display randomly selected bonus symbols in the bonus positions;

determine whether a trigger symbol is displayed in a game position of the at least one group; and in response to the trigger symbol being displayed in the game position of the at least one group, always award the game enhancing element associated with the bonus symbol displayed in the bonus position associated with the at least one group.

2. The gaming machine of claim 1, wherein each bonus position is associated with one of said groups.

3. The gaming machine of claim 1, wherein the bonus positions are each adjacent to its associated group.

4. The gaming machine of claim 1, wherein there is a bonus position for each group in the array.

5. The gaming machine of claim 1, wherein there are fewer bonus positions than groups in the array.

6. The gaming machine of claim 5, wherein there are at least three bonus positions in the array and the groups comprise reels in the array.

7. The gaming machine of claim 6, wherein each bonus position is associated with at least one reel.

8. The gaming machine of claim 7, wherein there are five reels in the array and three bonus positions, the bonus positions being associated with the middle three reels in the array.

9. The gaming machine of claim 1, wherein, where there is more than one bonus position and the trigger symbol appears in more than one group, the controller must award each game enhancing element associated with the bonus symbols displayed in the bonus positions associated with the groups which display the trigger symbol.

10. The gaming machine of claim 1, wherein, where there is more than one bonus position and the trigger symbol appears in more than one group, the controller must award the game enhancing element having the highest value of the game enhancing elements associated with the bonus symbols displayed in the bonus positions associated with the groups which display the trigger symbol.

11. The gaming machine of claim 10, wherein the controller is configured to store a hierarchy of values for the game enhancing elements associated with the bonus symbols.

12. The gaming machine of claim 1, wherein, where more than one trigger symbol appears in the same group of game positions, the controller must award only one instance of the game enhancing element associated with the bonus symbol displayed in the bonus position associated with the group which displays the trigger symbol.

13. The gaming machine of claim 1, wherein, where more than one trigger symbol appears in the same group, the controller must award the game enhancing element for each trigger symbol displayed in the same group.

14. The gaming machine of claim 1, wherein the groups comprise reels in the array.

15. The gaming machine of claim 1, wherein the bonus symbols displayed in the bonus positions change between plays of the game.

16. The gaming machine of claim 1, wherein the bonus symbol, which was displayed in the bonus position associated with the at least one group and which is associated with the awarded game enhancing element, is displayed in the same bonus position for one or more subsequent plays of the game.

17. The gaming machine of claim 1, wherein the bonus positions each display a bonus symbol that awards a different type of game enhancing element for any one play of the game.

18. The gaming machine of claim 1, wherein each bonus position is associated with a different type of game enhancing element.

19. The gaming machine of claim 1, wherein the game enhancing elements comprise at least one or more of a predetermined number of free games, a win multiplier, wild multipliers, bonus wilds, symbols that cause the award of additional free games, trigger symbols to retrigger the game, held columns, random wild symbols, stacked symbols, bonus symbols, new game symbols, reveal symbols, progressives, bonus credits, jackpot symbols, and one or more symbol replacements.

20. A gaming machine comprising:

at least one video display for displaying a game, and;

a value input comprising at least one of a coin acceptor and a bill acceptor; and at least one electronic controller coupled to the at least one video display and the value input;

wherein the controller is configured to:

determine if a wager has been received via the value input;

display the game on the display including one or more configurations of game symbols if the wager has been received, one or more of the configurations of game symbols being associated with a game outcome, the game outcome being associated with a value award payable to a player;

provide a plurality of reels comprising game positions for displaying game symbols and the one or more configurations of game symbols;

provide one or more bonus positions, the bonus positions each displaying a bonus symbol associated with a game enhancing element;

associate at least one bonus position with at least one reel;

display randomly selected bonus symbols in the bonus positions;

determine whether a trigger symbol is displayed in a game position of the at least one reel; and in response to the trigger symbol being displayed in the game position of the at least one reel, always award the game enhancing element associated with the bonus symbol displayed in the bonus position associated with the at least one reel.

* * * * *